(12) United States Patent
Nam

(10) Patent No.: US 12,207,346 B2
(45) Date of Patent: Jan. 21, 2025

(54) ELECTRONIC DEVICE AND METHOD FOR ROAMING BASED ON WI-FI IN ELECTRONIC DEVICE

(71) Applicant: Samsung Electronics Co., Ltd., Suwon-si (KR)

(72) Inventor: Chounjong Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 17/586,550

(22) Filed: Jan. 27, 2022

(65) Prior Publication Data
US 2022/0240077 A1    Jul. 28, 2022

Related U.S. Application Data

(63) Continuation of application No. PCT/KR2022/001323, filed on Jan. 25, 2022.

(30) Foreign Application Priority Data

Jan. 27, 2021 (KR) .................. 10-2021-0011868

(51) Int. Cl.
*H04W 12/00* (2021.01)
*H04L 61/5014* (2022.01)
(Continued)

(52) U.S. Cl.
CPC .......... *H04W 8/12* (2013.01); *H04L 61/5014* (2022.05); *H04W 12/068* (2021.01); *H04W 84/12* (2013.01)

(58) Field of Classification Search
None
See application file for complete search history.

(56) References Cited

U.S. PATENT DOCUMENTS

2005/0117524 A1    6/2005   Lee et al.
2006/0256763 A1   11/2006   Nguyen et al.
(Continued)

FOREIGN PATENT DOCUMENTS

CN    101420759 A    4/2009
CN    103945361 A    7/2014
(Continued)

OTHER PUBLICATIONS

International Search Report and Written Opinion of the International Searching Authority dated Apr. 27, 2022, in connection with International Application No. PCT/KR2022/001323, 12 pages.
(Continued)

*Primary Examiner* — Abdelillah Elmejjarmi

(57) ABSTRACT

According to various embodiments, an electronic device may comprise a communication module, a memory, and a processor electrically connected with the communication module and the memory. The processor may be configured to perform a communication connection with a first access point (AP) of a first service set identification (SSID) and a first security type through the communication module, generate first roaming group information associated with the first AP, identify whether there is an AP having the first SSID and the first security type when roaming while performing the communication connection with the first AP through the communication module, and in response to being not identified the AP having the first SSID and the first security type, perform roaming from the first AP to a second AP which is identified based on the first roaming group information.

20 Claims, 11 Drawing Sheets

(51) Int. Cl.
  *H04W 8/12*     (2009.01)
  *H04W 12/06*    (2021.01)
  *H04W 84/12*    (2009.01)

(56)     References Cited

U.S. PATENT DOCUMENTS

| | | |
|---|---|---|
| 2008/0075035 A1 | 3/2008 | Eichenberger |
| 2010/0211777 A1 | 8/2010 | Ishihara et al. |
| 2013/0301627 A1 | 11/2013 | Chen et al. |
| 2014/0204933 A1 | 7/2014 | Roy et al. |
| 2016/0135116 A1 | 5/2016 | Chen |
| 2017/0339728 A1 | 11/2017 | Lee et al. |
| 2018/0167389 A1 | 6/2018 | Zou et al. |
| 2018/0191572 A1* | 7/2018 | Ben-Haim .......... H04L 41/0893 |
| 2020/0288297 A1 | 9/2020 | Li et al. |
| 2021/0014776 A1 | 1/2021 | Patil et al. |

FOREIGN PATENT DOCUMENTS

| | | | |
|---|---|---|---|
| CN | 107222881 A | | 9/2017 |
| CN | 111918350 A | | 11/2020 |
| KR | 10-2016-0030966 A | | 3/2016 |
| WO | 2009011055 A1 | | 1/2009 |

OTHER PUBLICATIONS

Cisco, "802.11 WLAN Roaming and Fast-Secure Roaming on CUWN," Aug. 29, 2018, 52 pages.
Supplementary European Search Report dated Apr. 19, 2024, in connection with European Application No. 22746206.6, 11 pages.

* cited by examiner

ELECTRONIC DEVICE AND METHOD FOR ROAMING BASED ON WI-FI IN ELECTRONIC DEVICE

CROSS-REFERENCE TO RELATED APPLICATIONS

This application is a continuation of International Application No. PCT/KR2022/001323 designating the United States, filed on Jan. 25, 2022, in the Korean Intellectual Property Receiving Office and claiming priority to Korean Patent Application No. 10-2021-0011868, filed on Jan. 27, 2021, in the Korean Intellectual Property Office, the disclosures of which are incorporated by reference herein in their entireties.

BACKGROUND

1. Field

Various embodiments relate to an electronic device and Wi-Fi roaming in an electronic device.

2. Description of Related Art

The electronic device may use the Internet through a wireless local area network (WLAN) environment. When an electronic device using a wireless local area network (WLAN) is moving, it may be requested to provide a seamless communication service. Accordingly, the importance of roaming in a wireless local area network environment based on the IEEE 802.11 standard has been greatly emphasized. The IEEE 802.11 standard is a standard associated with wireless fidelity (Wi-Fi) or WLAN. WLAN is a wireless version of the local area network (LAN) and has a limited use range. As the electronic device moves away from the access point (AP), the communication speed may gradually decrease, and if the electronic device is completely out of range, the connection may be disconnected. To prevent such occasion, roaming technology is used. Roaming may be a function in which the electronic device moves from one AP to another while maintaining network connectivity.

An electronic device, which is connected with an AP (e.g., AP1) to perform communication, may perform a roaming operation if communication with AP1 worsens as the electronic device moves away from AP1 or for other reasons. During the roaming operation, the electronic device may perform a scan operation to find at least one AP (e.g., AP2) other than AP1 currently in connection. If at least one AP having the same service set identification (SSID) and security type as AP1 currently in connection is identified among scanned APs, the electronic device may select an AP (e.g., AP2) onto which it is to roam from among the at least one identified AP and generate a new connection with AP2 seamlessly for communication.

However, if roaming is possible only with APs having the same SSID and security type as the AP currently in communication, roaming targets may be limited. As Wi-Fi technology develops, various SSIDs are being used, and security types (e.g., security types using pre-shared key (PSK), Wi-Fi protected access (WPA), WPA2, or WPA3) are being developed. Accordingly, in many cases, APs having different SSIDs or security types are installed and used in one space. It may be expected that more and more users desire to roam between APs having different security types or SSIDs.

According to various embodiments, there may be provided an electronic device that enables roaming with AP2 having a different SSID and security type from AP1 while being in connection with AP1 and a Wi-Fi-based roaming method in the electronic device.

According to various embodiments, there may be provided an electronic device that enables roaming by providing information for AP2 which has a different SSID and security type from AP1 but the electronic device may roam to, while being in connection with AP1 and a Wi-Fi-based roaming method in the electronic device.

SUMMARY

According to various embodiments, an electronic device may comprise a communication module supporting Wi-Fi communication, a memory, and a processor operatively connected with the communication module and the memory. The processor may be configured to perform a communication connection with a first access point (AP) of a first service set identification (SSID) and a first security type through the communication module, generate first roaming group information associated with the first AP, identify whether there is an AP having the first SSID and the first security type when roaming while performing the communication connection with the first AP through the communication module, and in response to being not identified the AP having the first SSID and the first security type, perform roaming from the first AP to a second AP which is identified based on the first roaming group information.

According to various embodiments, a method for roaming based on Wi-Fi in an electronic device may comprise identifying first roaming group information associated with a first access point (AP) of a first service set identification (SSID) and a first security type based on a connection with the first AP through a communication module, identifying whether there is an AP having the first SSID and the first security type when roaming while performing the connection with the first AP through the communication module, and in response to being not identified the AP having the first SSID and the first security type, performing roaming from the first AP to the second AP which is identified based on the first roaming group information through the communication module.

According to various embodiments, there may be provided a non-volatile storage medium storing instructions, the instructions configured to be executed by at least one processor to enable the at least one processor to perform at least one operation. The at least one operation may comprise identifying first roaming group information associated with a first AP of a first SSID and a first security type based on a connection with the first AP through a communication module, identifying whether there is an AP having the first SSID and the first security type when roaming while performing the connection with the first AP through the communication module, and in response to being not identified the AP having the first SSID and the first security type, performing roaming from the first AP to the second AP which is identified based on the first roaming group information through the communication module.

According to various embodiments, it is possible to enable an electronic device to roam with AP2 having a different SSID and security type from AP1 while the electronic device is in connection with AP1.

According to various embodiments, it is possible to enable an electronic device to roam by providing information for AP2 which has a different SSID and security type from AP1 but the electronic device may roam to, while the electronic device is in connection with AP1, thereby ensuring continuity of use of Wi-Fi and reducing user inconvenience.

Effects of the disclosure are not limited to the foregoing, and other unmentioned effects would be apparent to one of ordinary skill in the art from the following description.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

The same or similar reference denotations may be used to refer to the same or similar elements throughout the specification and the drawings.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Figure 1:
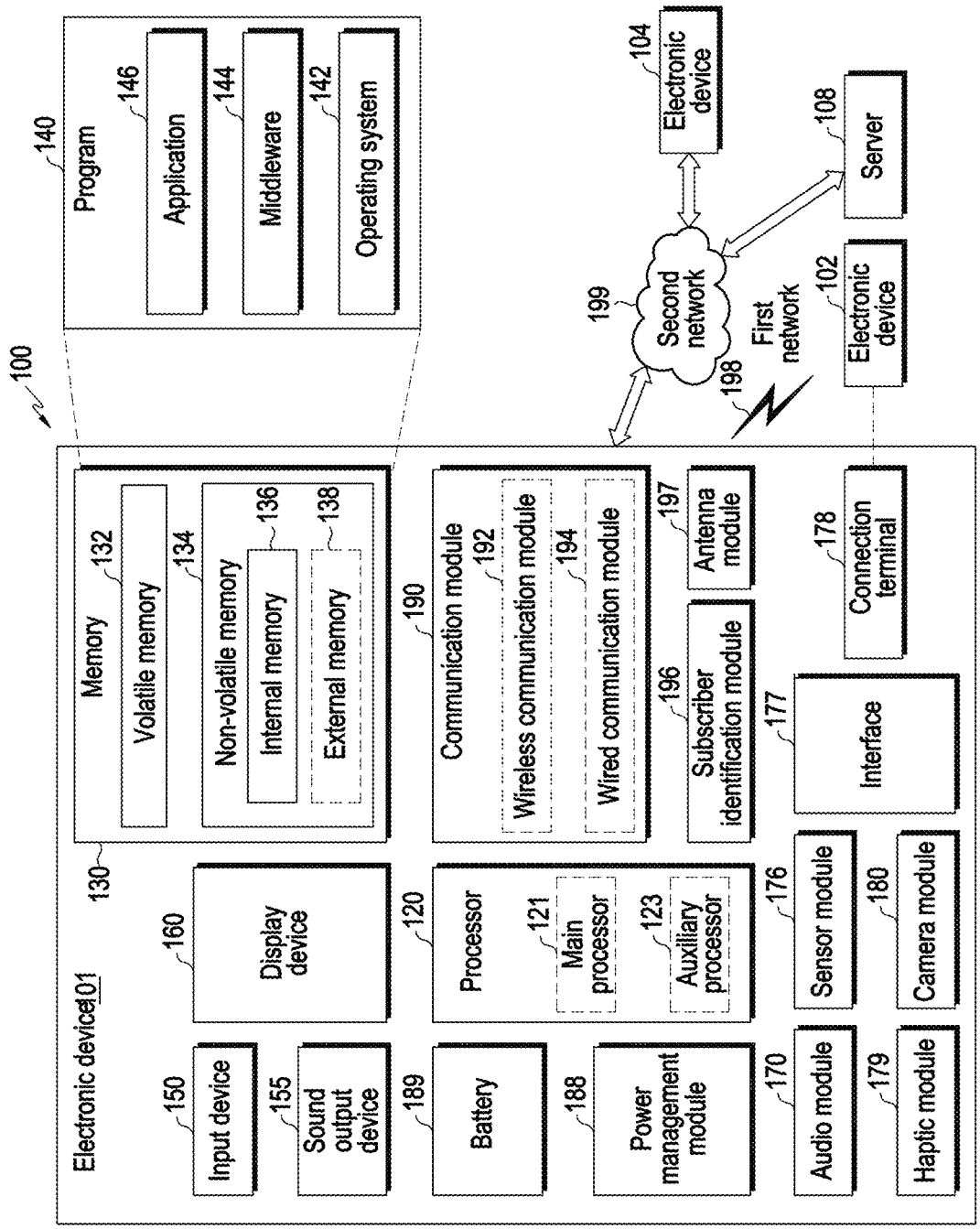
FIG. 1 illustrates a block diagram of an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
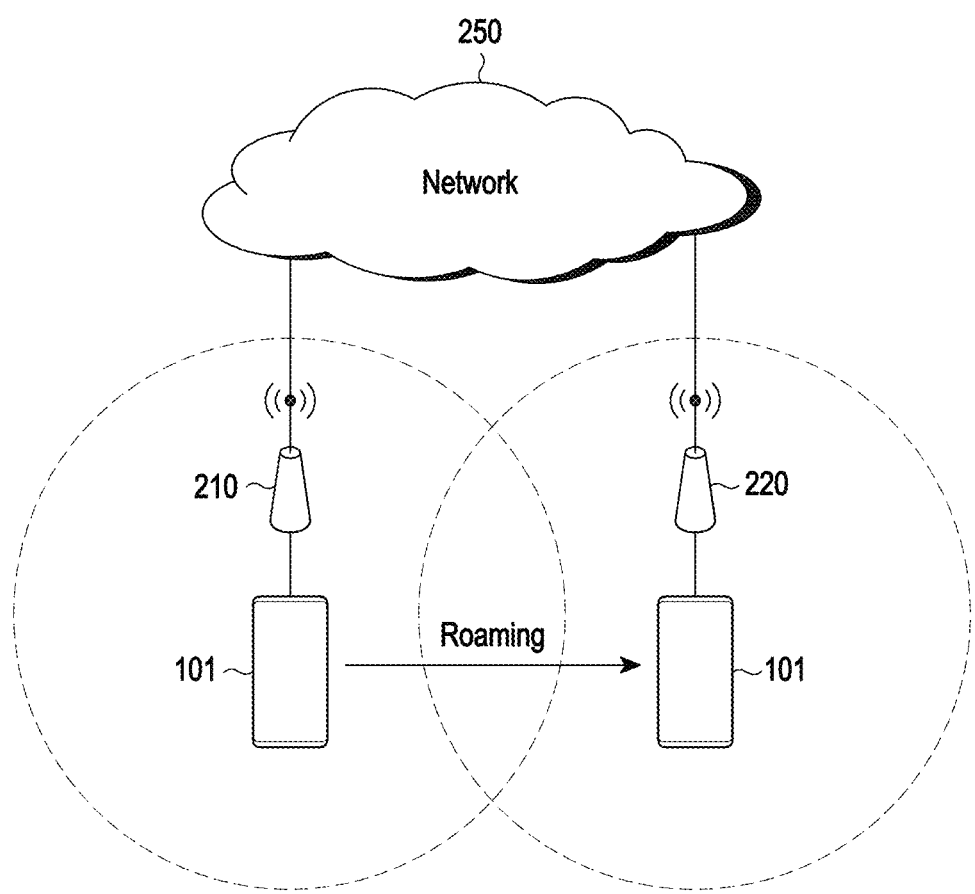
FIG. 2 illustrates a view schematically of roaming of an electronic device between APs according to an embodiment.

FIG. 2 illustrates a view schematically of roaming of an electronic device between APs according to an embodiment.

Referring to FIG. 2, an electronic device 101 according to an embodiment is connected with a first AP (or AP1) 210 and is connected with a network 250 through the first AP 210 to receive a wireless communication service. The electronic device 101 according to an embodiment may perform a roaming operation while being connected with the first AP 210. According to an embodiment, the electronic device 101 may perform a roaming operation while in connection with the first AP 210 (or when roaming is needed, a roaming trigger occurs, or a roaming condition is met while in connection). For example, while in connection with the first AP 210, the electronic device 101 may perform a roaming operation based on the received signal strength indication (RSSI), channel utilization, presence or absence of data communication, and/or display on/off. For example, the electronic device 101 may perform a roaming operation when the strength of the signal received from the connected first AP 210 is lower than a designated signal strength. As another example, the electronic device 101 may perform a roaming operation when the channel utilization through the connected first AP 210 is smaller than a designated channel utilization. As another example, the electronic device 101 may perform a roaming operation when data communication is not performed through the connected first AP 210. As another example, the electronic device 101 may perform a roaming operation when the user requests to roam to another AP while in connection with the first AP 210. As another example, the electronic device 101 may perform a roaming operation when the display is turned off and then turned back on while in connection with the first AP 210.

According to an embodiment, the electronic device 101 may identify the presence of at least one AP by performing a scan during the roaming operation. For example, the electronic device 101 may perform a scan operation to receive at least one beacon message and identify the presence of at least one AP, based on the at least one beacon message. As another example, the electronic device 101 may transmit a probe request message and identify the presence of at least one AP, by receiving a probe response message in response to the probe request message. For example, the electronic device 101 may identify the presence of at least one AP, through any one of the beacon message and the probe response message (e.g., whichever is received earlier). According to an embodiment, the electronic device 101 may obtain AP information (e.g., AP profile) for at least one AP. For example, the AP information may include all or some of the AP's SSID, BSSID, media access control (MAC) address, dynamic host configuration protocol (DHCP) server address, connection history information, AP position information, and/or user input information.

According to an embodiment, the electronic device 101 may identify the presence of an AP having the same SSID and security type as the first AP 210 using the obtained AP information for the at least one AP. According to an embodiment, when there is an AP having the same SSID and security type as the first AP 210, the electronic device 101 may perform roaming with the corresponding AP. According to an embodiment, when there is no AP having the same SSID and security type as the first AP 210, the electronic device 101 may identify a second AP (e.g., AP2) 220, to which it may roam, among the at least one AP using pre-stored (or pre-obtained) first roaming group information associated with the first AP 210 and the obtain AP information for the at least one AP. For example, although the SSID and/or security type of the second AP 220 is not identical to that of the first AP 210, the second AP 220 may be an AP included in the roaming group information associated with the first AP. According to an embodiment, the electronic device 101 may stop connection with the first AP 210 and perform connection with the second AP 220 without disconnection of communication. For example, being without disconnection of communication may include when the communication connection between the electronic device 101 and the network 250 is switched from the first AP 210 to the second AP 220 without interference by the user and/or host and continuously perform communication connection. As another example, being without disconnection of communication may include when the electronic device 101 is connected with the network 250 through the second AP 220 without interference by the user and/or host while in connection with the network 250 through the first AP 210.

Figure 3:
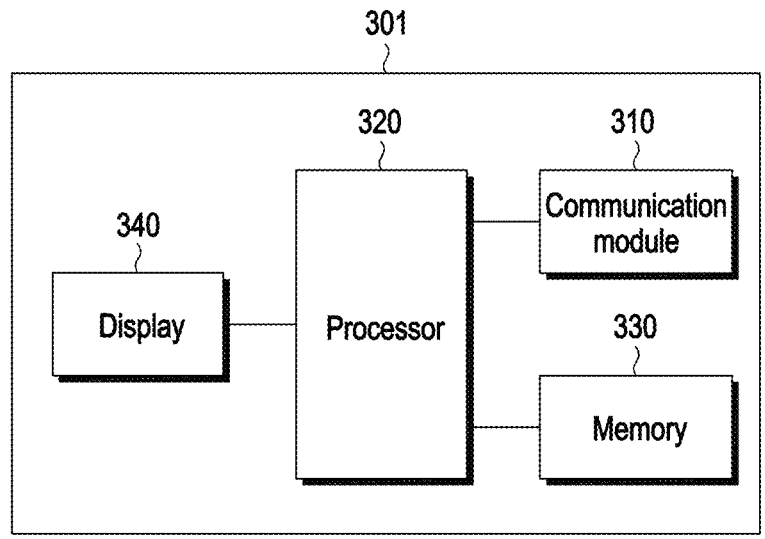
FIG. 3 illustrates a block diagram of an electronic device according to an embodiment.

FIG. 3 illustrates a block diagram of an electronic device according to an embodiment.

Referring to FIG. 3, according to an embodiment, an electronic device 301 (e.g., the electronic device 101 of FIG. 1) may include a communication module 310 (e.g., the communication module 190 of FIG. 1), a processor 320 (e.g., the processor 120 of FIG. 1), a memory 330 (e.g., the memory 130 of FIG. 1), and a display 340 (e.g., the display module 160 of FIG. 1).

According to an embodiment, the communication module 310 may establish a short-range wireless communication channel between the electronic device 301 and an external AP or support performing of communication through the established short-range wireless communication channel. For example, the communication module 310 may include a Wi-Fi communication module (e.g., a Wi-Fi chip or a Wi-Fi integrated chip (IC)) and may establish a Wi-Fi-based Wi-Fi communication channel with the external AP and support performing of communication through the established Wi-Fi communication channel. According to an embodiment, the communication module 310 may obtain roaming group information associated with the first AP 210 while performing communication with the first AP (e.g., the first AP 210 of FIG. 2). For example, the Wi-Fi module may obtain (or receive) roaming group information associated with the first AP 210 from the processor 320 while performing Wi-Fi-based communication with the first AP 210. For example, the communication module 310 may obtain (or receive), from the processor 320, roaming group information associated with the first AP 210 when connecting with the first AP 210 or when roaming is required while in connection with the first AP 210 (or when a roaming condition is met or when a roaming trigger occurs). According to an embodiment, when there is no AP having the same SSID and security type as the first AP 210 when roaming, the communication module 310 may identify a roamable second AP (e.g., the second AP 220 of FIG. 2) using the roaming group information associated with the first AP 210 and perform roaming from the first AP 210 to the second AP 220.

According to an embodiment, the processor 320 may execute, for example, software (e.g., a program 140) to control at least one other component (e.g., a hardware or software component) of the electronic device 301 coupled with the processor 320, and may perform various data processing or computation.

According to an embodiment, the processor 320 may obtain the respective AP information of a plurality of APs and identify APs roamable between each other using the obtained AP information of the plurality of APs. For example, the processor 320 may obtain AP information of APs for which there is a history of connection through the communication module 310 or APs for which there is a history of having been searched and/or obtain the respective AP information of the plurality of APs associated with the electronic device 301 from an external device (e.g., an external server) (not shown). According to an embodiment, the processor 320 may obtain roaming group information for a group of the APs roamable between each other and store the roaming group information. For example, the roaming group information may include the AP information of each of the APs roamable between each other and the roaming group including each of the APs.

According to an embodiment, the processor 320 may identify the roaming group information (e.g., first roaming group information) associated with the first AP 210 based on connection with the first AP 210 through the communication module 310 and transfer the identified roaming group information associated with the first AP 210 to the communication module 310. According to an embodiment, the processor 320 may identify that the communication module 310 performs roaming from the first AP 210 to the second AP 220 based on the roaming group information associated with the first AP 210. According to an embodiment, the processor 320 may identify roaming group information (e.g., second roaming group information) associated with the second AP 220 based on a connection with the second AP 220 according to the roaming through the communication module 310 and provide the identified roaming group information associated with the second AP 220 to the communication module 310.

According to an embodiment, the memory 330 may store various data used by at least one component (e.g., the processor 320 or the communication module 310, or the display 340) of the electronic device 301. The various data may include, for example, software and input data or output data for a command related thereto.

According to an embodiment, the memory 330 may store instructions to perform the operation of the electronic device 301. According to an embodiment, the memory 330 may be implemented in various types, such as a read only memory (ROM), a random access memory (RAM), or a flash memory, but not limited in type thereto.

According to an embodiment, the display 340 may include a touchscreen and may display related data when the processor 320 obtains and stores roaming group information. According to an embodiment, the display 340 may display associated data when the processor 320 provides the stored roaming group information.

According to various embodiments, an electronic device (e.g., the electronic device 101 of FIG. 1 or the electronic device 301 of FIG. 3) may comprise a communication module (e.g., the communication module 190 of FIG. 1 or the communication module 310 of FIG. 3) supporting Wi-Fi communication, a memory (e.g., the memory 130 of FIG. 1 or the memory 330 of FIG. 3), and a processor (e.g., the processor 120 of FIG. 1 or the processor 320 of FIG. 3) operatively connected with the communication module and the memory. The processor may perform a communication connection with a first access point (AP) of a first service set identification (SSID) and a first security type through the communication module, generate first roaming group information associated with the first AP, identify whether there is an AP having the first SSID and the first security type when roaming while performing the communication connection with the first AP through the communication module, and in response to being not identified the AP having the first SSID and the first security type, perform roaming from the first AP to a second AP which is identified based on the first roaming group information.

According to various embodiments, the processor may transfer second roaming group information associated with the second AP to the communication module based on connection with the second AP through the communication module.

According to various embodiments, in response to identifying the AP having the first SSID and the first security type, the processor may perform roaming from the first AP to the AP (e.g., a third AP) having the first SSID and the first security type.

According to various embodiments, the first roaming group information may include at least one of a second SSID different from the first SSID and/or a second security type different from the first security type.

According to various embodiments, the processor may search for at least one AP corresponding to the first roaming group information based on the first roaming group information, and when the searched at least one AP includes a plurality of APs, identify the second AP among the plurality of APs.

According to various embodiments, the processor may obtain AP information of each of a plurality of APs, identify APs roamable between each other using the AP information of each of the plurality of APs, and store, in the memory, roaming group information on at least one roaming group obtained by grouping the APs roamable between each other.

According to various embodiments, the AP information may include at least one of an SSID, a basic service set identification (BSSID), a MAC address, a DHCP server address, connection history information, AP position information, and user input information.

According to various embodiments, the processor may obtain the roaming group information for the at least one group of the APs roamable between each other based on an occurrence of a designated event.

According to various embodiments, the designated event may include at least one of an event associated with adding, changing, or deleting AP information, an AP connection event, or a user input event.

Figure 4:
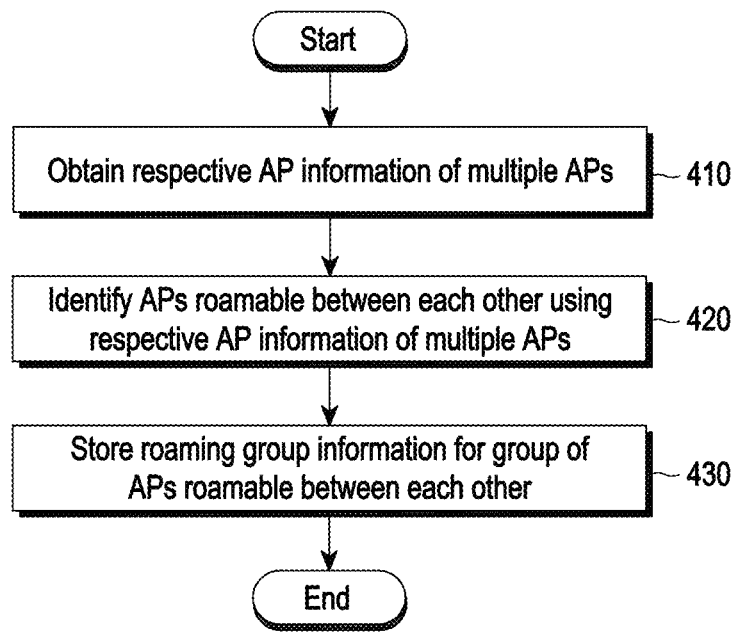
FIG. 4 illustrates a flowchart of an operation of storing roaming group information in an electronic device according to an embodiment.

FIG. 4 illustrates a flowchart of an operation of storing roaming group information in an electronic device according to an embodiment.

Referring to FIG. 4, according to an embodiment, a processor (e.g., the processor 120 of FIG. 1 or the processor 320 of FIG. 3) of an electronic device (e.g., the electronic device 101 of FIG. 1 or the electronic device 301 of FIG. 3) may perform at least one of operations 410 to 430.

In operation 410, according to an embodiment, the processor 320 may obtain AP information of each of a plurality of APs. For example, the processor 320 may perform a scan operation to obtain information of at least one AP positioned around the electronic device 301 through the communication module 310. According to an embodiment, the processor 320 may obtain AP information of APs for which there is a history of connection through the communication module 310 or APs for which there is a history of having been searched and/or obtain the respective AP information of the plurality of APs associated with the electronic device 301 from an external device (e.g., an external server) (not shown). According to an embodiment, the processor 320 may store the obtained AP information of each AP in the memory 330. For example, the AP information may include all or some of the SSID, BSSID, MAC address, DHCP server address, connection history information, AP position information, and/or user input information.

In operation 420, according to an embodiment, the processor 320 may identify APs roamable between each other using the AP information of each of the plurality of APs. According to an embodiment, the processor 320 may identify APs roamable between each other using the stored AP information of each of the plurality of APs based on an occurrence of a designated event (or when a designated condition is met). For example, the designated event may include an event associated with adding, changing, or deleting AP information (AP profile), an AP connection (e.g., connection of a new AP or an AP connection due to roaming) event, or a user input (e.g., an input of a request for identifying roamable APs) event.

According to an embodiment, the processor 320 may identify APs roamable between each other based on the SSID, BSSID, MAC address, DHCP server address, connection history information, AP position information included in the AP information of each of the plurality of APs and/or the user input information.

According to an embodiment, the processor 320 may identify APs roamable between each other based on the similarity between the SSIDs included in the respective AP information of the plurality of APs, the similarity of the BSSIDs included in the respective AP information of the plurality of APs, the similarity of the MAC addresses included in the respective AP information of the plurality of APs, the similarity of the connection history information (connection time or connection position) included in the respective AP information of the plurality of APs, the similarity of the respective positions of the plurality of APs, information for the user account where each of the plurality of APs is registered, and/or roamable AP information input by the user.

For example, the processor 320 may identify each digit of the SSID values included in the respective AP information of the plurality of APs, compare the digit values of the SSIDs included in the respective AP information of the plurality of APs, and identify that APs having SSIDs for which the difference between the digits is a designated difference or less (e.g., one digit or less) are APs roamable between each other. As another example, the processor 320 may identify each digit of the BSSID values included in the respective AP information of the plurality of APs, compare the digit values of the BSSIDs included in the respective AP information of the plurality of APs, and identify that APs having BSSIDs for which the difference between the digit values is a designated difference or less (e.g., one digit or less) are APs roamable between each other. As another example, the processor 320 may identify the MAC address values included in the respective AP information of the plurality of APs and identify that the APs having MAC address values for which the difference between the MAC addresses included in the respective AP information of the plurality of APs is a designated difference or less (e.g., a two- or three-digit difference or less) are APs roamable between each other. As another example, the processor 320 may identify that the APs having the same DHCP server address value included in the respective AP information of the plurality of APs are APs roamable between each other. As another example, the processor 320 may identify that APs which were connected within a designated distance or within a designated time according to the connection history information (connection time or connection position) included in the respective AP information of the plurality of APs are APs roamable between each other. As another example, the processor 320 may compare the position information included in the respective AP information of the plurality of APs and identify that APs for which the distance between their positions is a designated distance or less are APs roamable between each other. As another example, the processor 320 may compare the user account information included in the respective AP information of the plurality of APs and identify that APs registered in the same user account are APs roamable between each other. As another example, the processor 320 may identify that APs selected from among the plurality of APs by the user are APs roamable between each other or associate the respective information of the plurality of APs, input by the user, and identify APs roamable between each other.

In operation 430, according to an embodiment, the processor 320 may store roaming group information for a group of the APs roamable between each other. According to an embodiment, when the first AP 210 and the second AP 220 are APs roamable between each other, the processor 320 may generate and store roaming group information including first AP information of the first AP 210, second AP information of the second AP 220, and information (e.g., a first link) indicating that the first AP 210 and the second AP 220 are APs roamable between each other. According to an embodiment, when the first AP 210 and the second AP 220 and the first AP 210 and a third AP (not shown) are APs roamable between each other, the processor 320 may generate and store roaming group information including the first AP information of the first AP 210, the second AP information of the second AP 220, the third AP information of the third AP, information (e.g., the first link) indicating that the first AP 210 and the second AP 220 are APs roamable between each other, information (e.g., a second link) indicating that the first AP 210 and the third AP are APs roamable between each other, and roaming priority information indicating the roaming priority between the second AP 220 and the third AP when roaming from the first AP 210 to another AP is performed.

Figure 5:
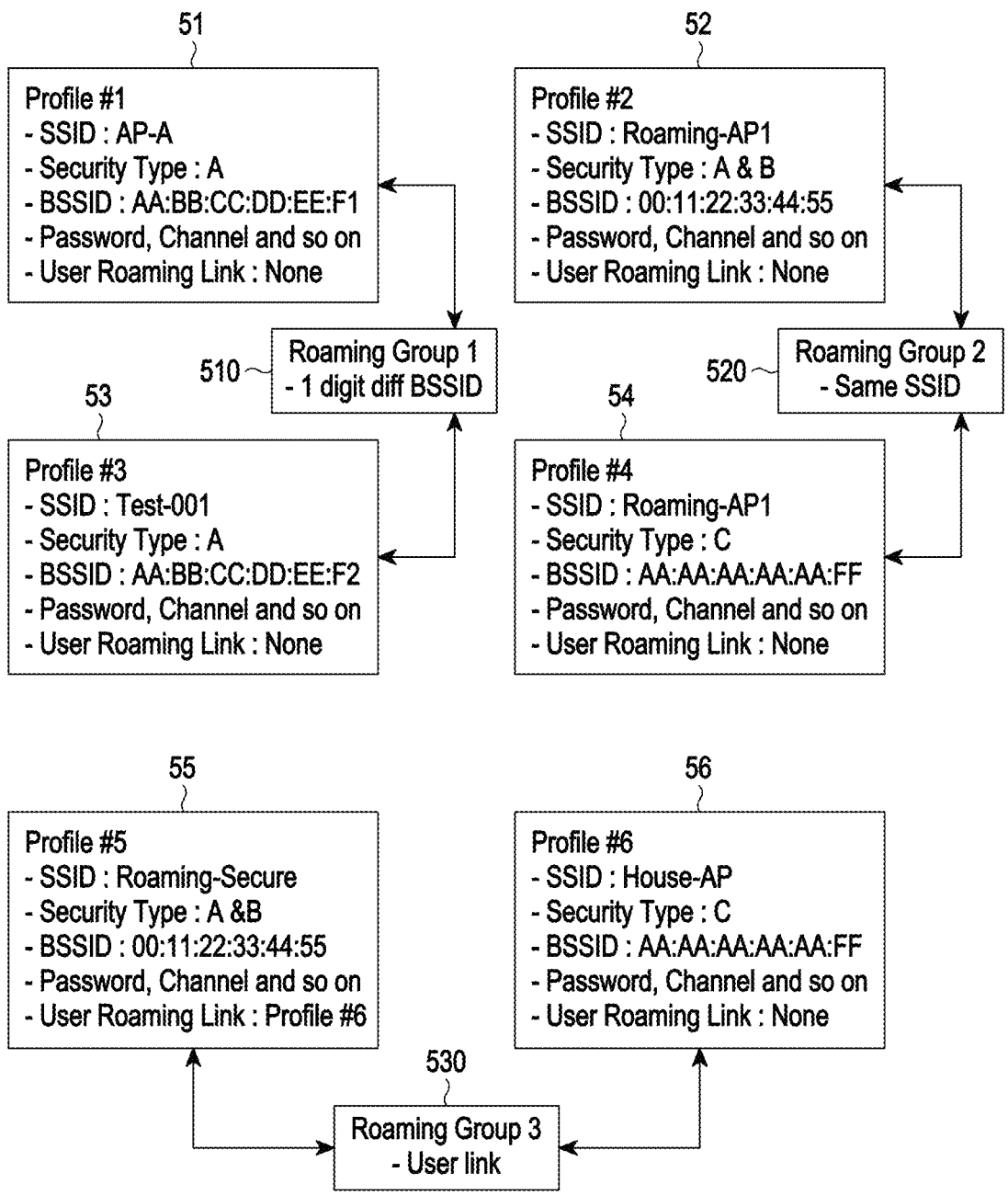
FIG. 5 illustrates a view of an example of generating roaming group information using AP information for each of a plurality of APs according to an embodiment.

FIG. 5 illustrates a view of an example of generating roaming group information using AP information for each of a plurality of APs according to an embodiment.

Referring to FIG. 5, according to an embodiment, AP information of each of the plurality of APs may include profiles. For example, when the plurality of APs are six APs, AP information for the six APs may include first AP information (profile #1) 51 to sixth AP information (profile #6) 56. For example, each AP information may include the SSID, BSSID, MAC address, DHCP server address, connection history information, AP position information, and/or user input information.

According to an embodiment, the processor 320 may group APs roamable between each other among the six APs using the first AP information (profile #1) 51 to the sixth AP information (profile #6) 56. For example, the processor 320 may group the first AP information (profile #1) 51 and the third AP information (profile #3) 53, whose BSSID values have a one-digit difference among the six APs, into a first roaming group (roaming group 1) 510. For example, the processor 320 may group the second AP information (profile #2) 52 and the fourth AP information (profile #4) 54, which have the same SSID value among the six APs, into a second roaming group (roaming group 2) 520. For example, the processor 320 may group the fifth AP information (profile #5) 55 and the sixth AP information (profile #6) 56 into a third roaming group (roaming group 3) 530 based on user input information (user roaming link) among the six APs. Although FIG. 5 illustrates an example in which three roaming groups are formed based on the respective AP information of the six APs, the number of APs is not limited thereto. It would readily be appreciated by one of ordinary skill in the art that other information, included in the AP information, than the SSID, BSSID, and user input information, may be used for grouping, or the information may be used in combination with the SSID, BSSID, or user input information.

Figure 6:
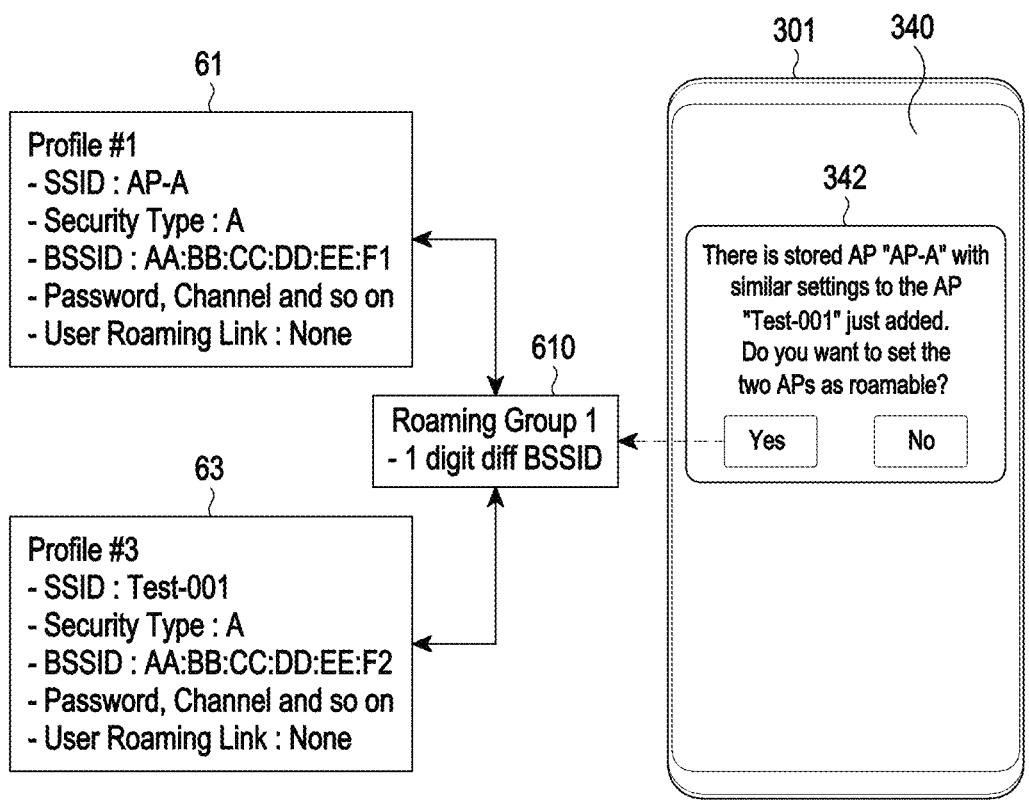
FIG. 6 illustrates a view of an example of a screen when respective AP information of a plurality of APs is grouped according to an embodiment.

FIG. 6 illustrates a view of an example of a screen when respective AP information of a plurality of APs is grouped according to an embodiment.

Referring to FIG. 6, according to an embodiment, the processor 320 of the electronic device 301 may obtain the third AP information (profile #3) 63, with the first AP information (profile #1) 61 stored. According to an embodiment, the processor 320 of the electronic device 301 may automatically generate the first AP information (profile #1) 61 and the third AP information (profile #3) 63 into a first roaming group 610 based on the BSSID values differing in only one digit between the first AP information (profile #1) 61 and the third AP information (profile #3) 63. According to an embodiment, the processor 320 of the electronic device 301 may display a message 342 for identifying whether to generate a roaming group on the display 340 based on the BSSID values differing only in one digit between the first AP information (profile #1) 61 and the third AP information (profile #3) 63 and, if the user's acknowledgment (e.g., YES) is received, generate the first AP information (profile #1) 61 and the third AP information (profile #3) 63 into the first roaming group 610.

Figure 7:
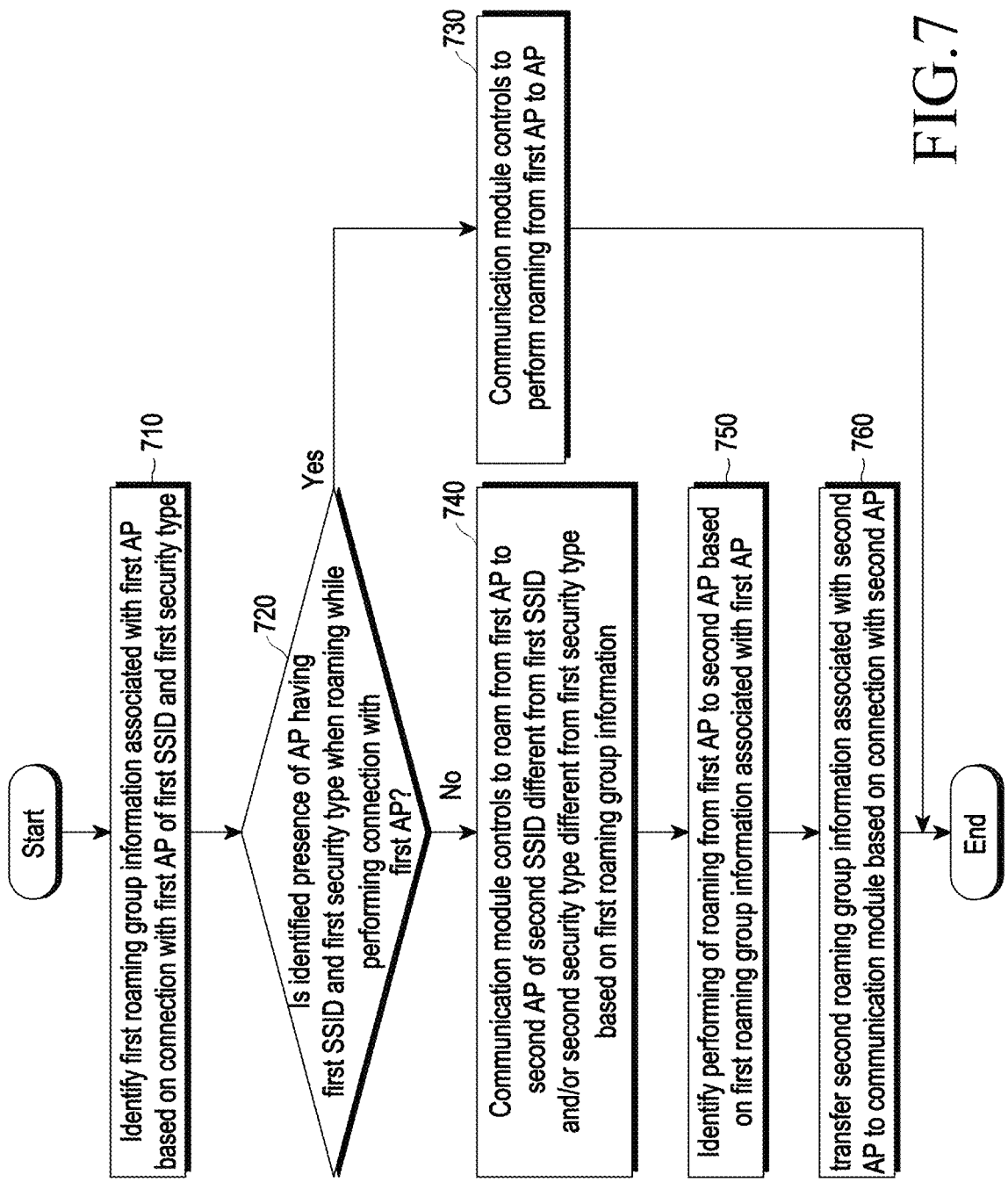
FIG. 7 illustrates a flowchart of an operation of transferring roaming group information in an electronic device according to an embodiment.

FIG. 7 illustrates a flowchart of an operation of transferring roaming group information in an electronic device according to an embodiment.

Referring to FIG. 7, according to an embodiment, a processor (e.g., the processor 120 of FIG. 1 or the processor 320 of FIG. 3) of an electronic device (e.g., the electronic device 101 of FIG. 1 or the electronic device 301 of FIG. 3) may perform at least one of operations 710 to 760.

In operation 710, according to an embodiment, the processor 320 may identify first roaming group information associated with the first AP, which is in connection for communication, based on connection with the first AP of a first SSID and a first security type through the communication module 310. For example, the processor 320 may identify the first roaming group information associated with the first AP stored in the memory 330 at the beginning, during, after communication connection with the first AP, or when a roaming condition occurs (or when a roaming trigger occurs) while in connection with the first AP. For example, the first roaming group information associated with the first AP may include information of an AP (e.g., the AP information of the second AP) to which it may roam from the first AP.

In operation 720, according to an embodiment, the processor 320 may identify whether there is an AP having the same first SSID and first security type as the first SSID and first security type (or search for an AP having the same first SSID and first security type as the first SSID and first security type) when roaming, while in connection with the first AP through the communication module 310. For example, the processor 320 may identify whether there is an AP having the same first SSID and first security type as those of the first AP from information of at least one AP obtained in the scan step that has been performed for connection with the first AP before connection with the first AP through the communication module 310. As another example, the processor 320 may identify whether there is another AP having the same first SSID and first security type as those of the first AP from information of at least one AP obtained by performing a new scan for roaming through the communication module 310.

In operation 730, according to an embodiment, if there is an AP having the same first SSID and first security type as those of the first AP, the processor 320 may control the communication module 310 to perform roaming from the first AP to the AP.

In operation 740, according to an embodiment, unless there is an AP having the same first SSID and first security type as the first AP, the processor 320 may control the communication module 310 to perform roaming from the first AP to the second AP having a second SSID different from the first SSID and/or a second security type different from the first security type based on the first roaming group information. For example, according to an embodiment, when there is no AP having the same first SSID and first security type as the first AP, the processor 320 may transfer the first roaming group information associated with the first AP to the communication module 310. Alternatively, the processor 320 may control the communication module 310 to obtain the first roaming group information associated with the first AP. According to another embodiment, the processor 320 may transfer the first roaming group information associated with the first AP to the communication module 310 based on a request from the communication module 310. For example, if it is determined that roaming is required while in connection with the first AP, the communication module 310 may send a request for the first roaming group information associated with the first AP to the processor 320.

In operation 750, according to an embodiment, the processor 320 may identify whether the communication module 310 has performed roaming from the first AP to the second AP based on the first roaming group information associated with the first AP. For example, when the communication module 310 roams from the first AP to the second AP and connects to the second AP based on the first roaming group information associated with the first AP, the communication module 310 may notify the processor 320 that it has connected to the second AP.

In operation 760, according to an embodiment, the processor 320 may identify second roaming group information associated with the second AP based on connection with the second AP through the communication module 310 and transfer the second roaming group information to the communication module 310. Alternatively, the processor 320 may control the communication module 310 to obtain the second roaming group information associated with the second AP. According to another embodiment, the processor 320 may transfer the second roaming group information associated with the second AP to the communication module 310 based on a request from the communication module 310.

Figure 8:
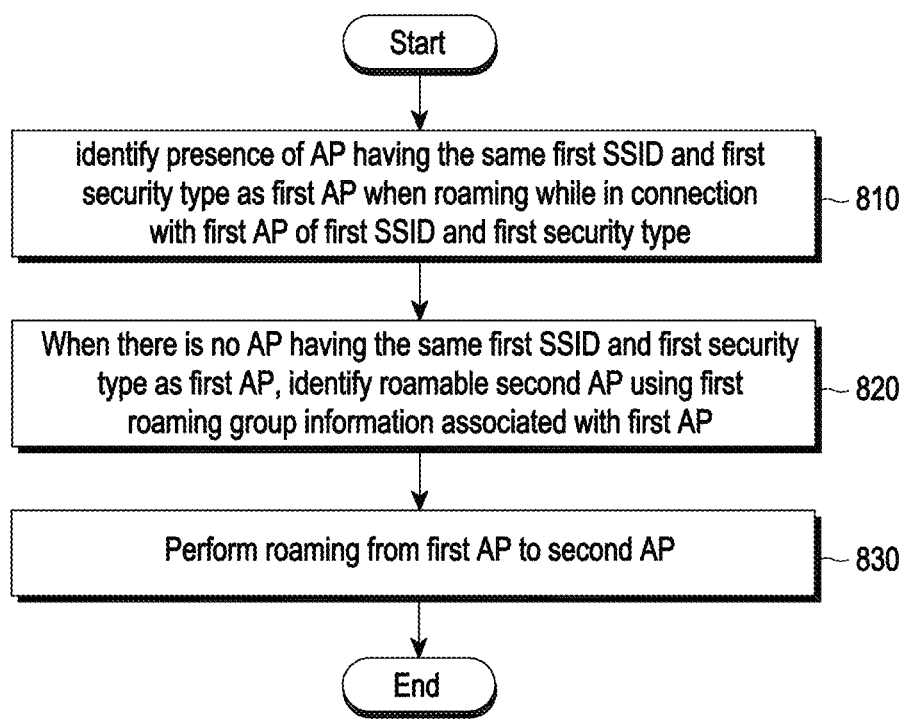
FIG. 8 illustrates a flowchart of a roaming operation using roaming group information in an electronic device according to an embodiment.

FIG. 8 illustrates a flowchart of a roaming operation using roaming group information in an electronic device according to an embodiment.

Referring to FIG. 8, according to an embodiment, a communication module (e.g., the communication module 190 of FIG. 1 or the communication module 310 of FIG. 3) of an electronic device (e.g., the electronic device 101 of FIG. 1 or the electronic device 301 of FIG. 3) may perform at least one of operations 810 to 830.

In operation 810, according to an embodiment, the communication module 310 may identify the presence of an AP having the same first SSID and first security type as the first AP (or search for an AP having the same first SSID and first security type as the first AP) when roaming while in connection with the first AP of the first SSID and first security type.

In operation 820, according to an embodiment, when there is no AP having the same first SSID and first security type as the first AP (or when an AP having the same first SSID and first security type as the first AP is not discovered or identified), the communication module 310 may identify information of a roamable AP using the first roaming group information associated with the first AP. For example, at the beginning of, during, after communication connection with the first AP, or when a roaming condition occurs (or when a roaming trigger occurs), the communication module 310 may receive the first roaming group information associated with the first AP from the processor 320, or obtain the first roaming group information associated with the first AP according to an instruction to obtain the first roaming group information associated with the first AP from the processor 320, or when roaming from the first AP is required, send a request for the first roaming group information to the processor 320 and obtain it. According to an embodiment, the communication module 310 may identify information of a roamable AP from the obtained first roaming group information.

For example, according to an embodiment, the communication module 310 may identify information of at least one AP included in the first roaming group information. For example, when the first roaming group information includes one roamable AP information, the communication module 310 may identify that the one roamable AP information is a roamable AP and, when the first roaming group information includes a plurality of roamable AP information, the communication module 310 may identify that the AP with the highest priority among the plurality of roamable AP information is a roamable AP. According to an embodiment, when the first roaming group information includes a plurality of roamable AP information, the communication module 310 may assign a weight to the signal strength (received signal strength indication (RSSI), channel utilization, whether data communication with the network 250 is performed, and/or security among the plurality of roamable APs and identify that the AP having the highest priority based on the weight is a roamable AP.

According to an embodiment, the communication module 310 may perform a scan operation for discovering a roamable AP based on the first roaming group information received from the processor 320. For example, in performing a scan operation, the communication module 310 may transmit a packet including a roamable specific SSID included in the first roaming group information and, upon receipt of a response signal from at least one AP including the specific SSID information, identify that one AP (e.g., the second AP) among the at least one AP having transmitted the response signal is a roamable AP.

According to another embodiment, in performing a scan operation to discover a roamable AP, the communication module 310 may perform the scan operation without including the first roaming group information. For example, the communication module 310 may broadcast probe request signals using "Wildcard SSID," receive a response signal from at least one AP positioned around, compare the SSID and security type of the at least one AP which has transmitted the response signal with the SSID and security type included in the first roaming group information, and identify that one AP (e.g., the second AP) is a roamable AP.

In operation 830, according to an embodiment, the communication module 310 may perform roaming from the first AP to the second AP. According to an embodiment, the communication module 310 may roam from the first AP to the second AP using the second AP information of the second AP included in the first roaming group information and connect communication with the second AP.

According to various embodiments, a method for roaming based on Wi-Fi in an electronic device (e.g., the electronic device 101 of FIG. 1 or the electronic device 301 of FIG. 3) may comprise identifying first roaming group information associated with a first access point (AP) of a first service set identification (SSID) and a first security type based on a connection with the first AP through a communication module (e.g., the communication module 190 of FIG. 1 or the communication module 310 of FIG. 3), identifying whether there is an AP having the first SSID and the first security type when roaming while performing the connection with the first AP through the communication module, and in response to being not identified the AP having the first SSID and the first security type, performing roaming from the first AP to the second AP which is identified based on the first roaming group information through the communication module.

According to various embodiments, the method may further comprise transferring second roaming group information associated with the second AP to the communication module based on connection with the second AP through the communication module.

According to various embodiments, the method may comprise in response to identifying the AP having the first SSID and the first security type, performing a roaming from the first AP to the AP having the first SSID and the first security type.

According to various embodiments, the first roaming group information may include at least one of a second SSID different from the first SSID and/or a second security type different from the first security type.

According to various embodiments, in the method may comprise searching for at least one AP corresponding to the first roaming group information based on the first roaming group information and when the searched at least one AP includes a plurality of APs, identify the second AP among the plurality of APs.

According to various embodiments, the method may comprise obtaining AP information of each of the plurality of APs, identifying APs roamable between each other using the AP information of each of the plurality of APs, and storing, in a memory, roaming group information on at least one roaming group obtained by grouping the APs roamable between each other.

According to various embodiments, the AP information may include at least one of an SSID, a BSSID, a MAC address, a DHCP server address, connection history information, AP position information, and user input information.

According to various embodiments, the method may obtain the roaming group information based on an occurrence of a designated event.

According to various embodiments, the designated event may include at least one of an event associated with adding, changing, or deleting AP information, an AP connection event, or a user input event.

Figure 9A:
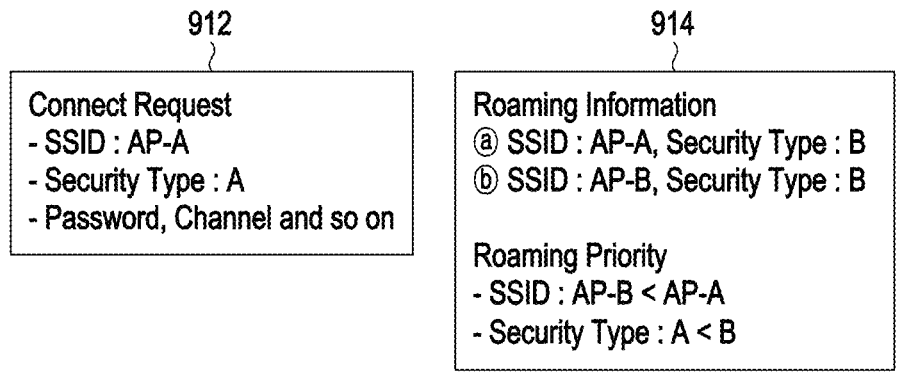
FIG. 9A illustrates a view of an example of roaming group information and a connect request message in an electronic device according to an embodiment.

FIG. 9A illustrates a view of an example of roaming group information and a connect request message in an electronic device according to an embodiment.

Referring to FIG. 9A, according to an embodiment, a processor (e.g., the processor 120 of FIG. 1 or the processor 320 of FIG. 3) of an electronic device (e.g., the electronic device 101 of FIG. 1 or the electronic device 301 of FIG. 3) may transfer a connect request message 912 with the first AP (e.g., AP-A) and first roaming group information 914 associated with the first AP to a communication module (e.g., the communication module 190 of FIG. 1 or the communication module 310 of FIG. 3). According to an embodiment, the processor 320 may transmit the first roaming group information 914 associated with the first AP immediately after transmitting the connect request message 912, while in connection with the first AP, or when roaming (or when a roaming condition is met or when a roaming trigger occurs) while in connection with the first AP.

According to an embodiment, the connect request message 912 may include information including the SSID, security type, password, and/or channel of the first AP which is the target for the connect request. According to an embodiment, the roaming group information 914 may include roaming information and roaming priority. For example, the roaming information may include information, such as "SSID:AP-A and security type:B" and "SSID:AP-B and security type:B" whose similarity to the "SSID:AP-A and security type:A" of the first AP, which is the target for the connect request, is a designated reference or more. For example, the roaming priority may include information indicating that the AP whose SSID is AP-A is higher in priority than the AP whose SSID is AP-B, such as "SSID: AP-B<AP-A," and/or information indicating that the AP whose security type is B is higher in priority than the AP whose security type is A, such as "security type A<B." According to an embodiment, the roaming priority of the roaming information may include the priority of the SSID and the security type. For example, APs with the same SSID may be higher in priority than APs with the same security type.

Figure 9B:
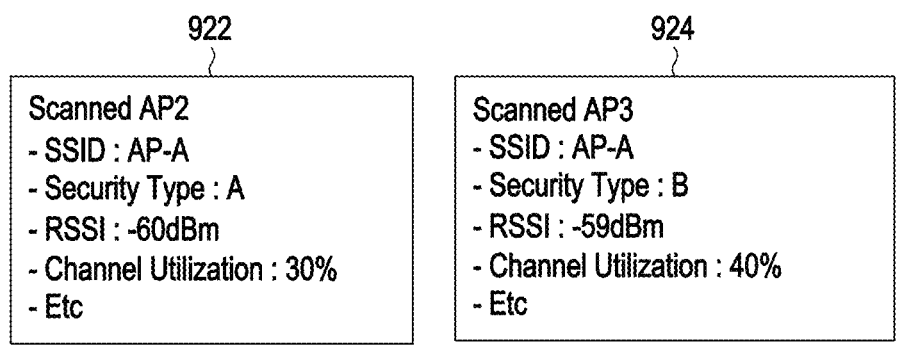
FIG. 9B illustrates a view of an example of APs scanned using roaming group information in an electronic device according to an embodiment.

FIG. 9B illustrates a view of an example of APs scanned using roaming group information in an electronic device according to an embodiment.

Referring to FIG. 9B, according to an embodiment, a communication module (e.g., the communication module 190 of FIG. 1 or the communication module 310 of FIG. 3) of an electronic device (e.g., the electronic device 101 of FIG. 1 or the electronic device 301 of FIG. 3) may perform a scan operation when roaming is required while in connection with the first AP (or when a roaming-related event occurs) and, as a result of the scan, obtain the information "scanned AP2 (922)" corresponding to "SSID:AP-A and security type:A" and "scanned AP3(924)" corresponding to "SSID:AP-B and security type:A." According to an embodiment, the communication module (e.g., the communication module 190 of FIG. 1 or the communication module of FIG. 3) of the electronic device (e.g., the electronic device 101 of FIG. 1 or the electronic device 301 of FIG. 3) may identify the AP, to which it is to roam from the first AP, based on the roaming information included in the roaming group information 914 obtained from the processor 320, among at least one AP (e.g., AP2 922 and AP3 924) identified through the scan. According to an embodiment, the communication module 310 may identify that the "scanned AP3(924)" is the second AP to which to be roamed based on the roaming priority "SSID:AP-B<AP-A" and "security type A<B" included in the roaming group information 914 among the results of the scan, "scanned AP2(922)" and "scanned AP3 (924)."

Figure 10:
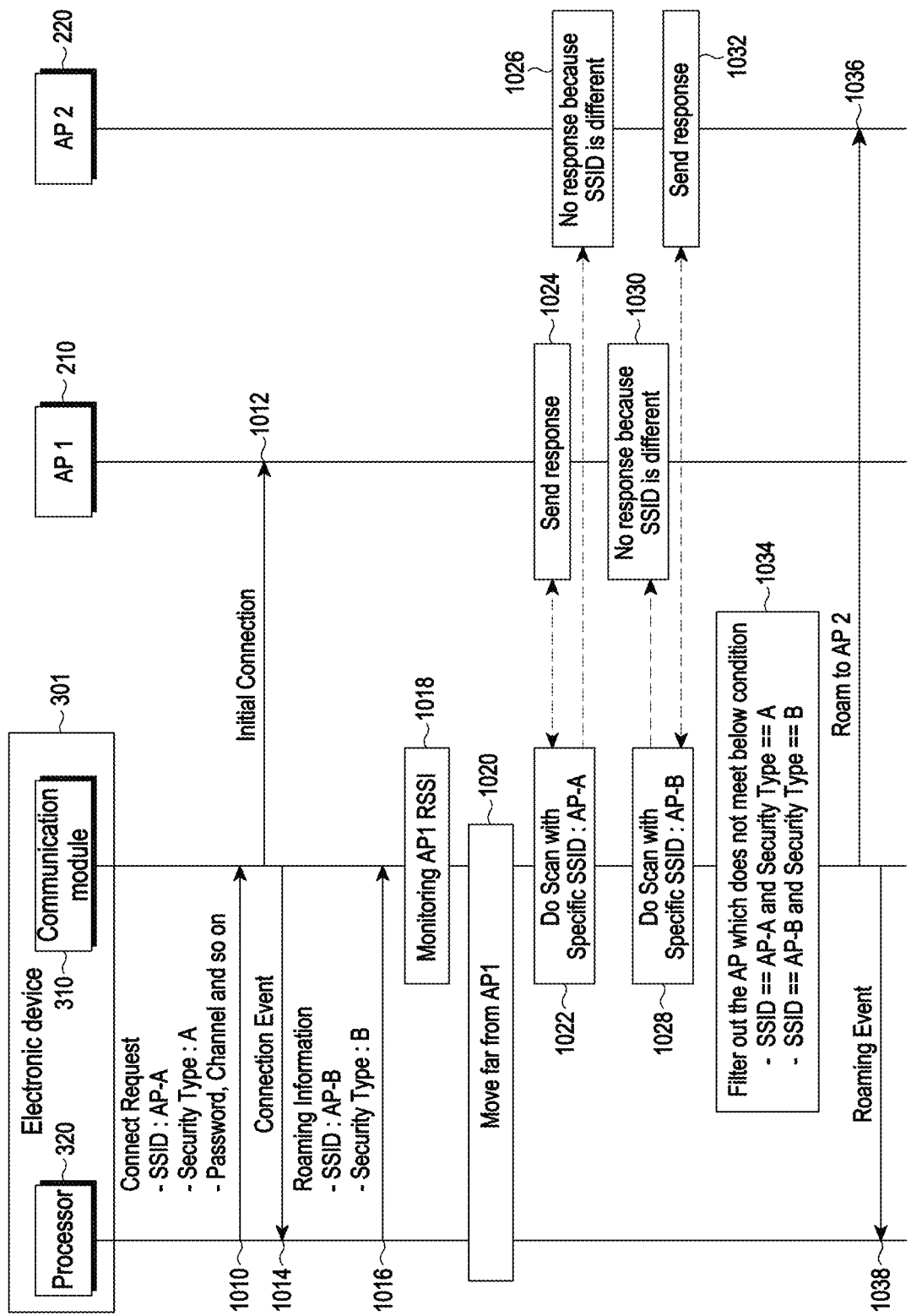
FIG. 10 illustrates a flowchart of a roaming operation using SSIDs between an electronic device, a first AP, and a second AP according to an embodiment.

FIG. 10 illustrates a flowchart of a roaming operation using SSIDs between an electronic device, a first AP, and a second AP according to an embodiment.

According to an embodiment, the operation flowchart of FIG. 10 may represent operations after storing the roaming group information in the electronic device through the operation flowchart of FIG. 4. For example, the electronic device 301 may perform the operations of FIG. 10 after performing a scan operation for searching for at least one AP around and then storing the roaming group information.

Referring to FIG. 10, in operation 1010, according to an embodiment, the processor 320 (e.g., the processor 120 of FIG. 1) of the electronic device 301 (e.g., the electronic device 101 of FIG. 1) may transfer a connect request message (connect request) with the first AP (AP1) 210 to the communication module 310 (e.g., the communication module 190 of FIG. 1).

In operation 1012, according to an embodiment, the communication module 310 may perform connection (initial connection) with AP1 210 based on the connect request message. For example, the communication module 310 may perform connection with AP1 210 corresponding to the information including "SSID:AP-A, security type: A, password, channel" based on the information including "SSID: AP-A, security type: A, password, channel" included in the connect request message (connect request).

In operation 1014, according to an embodiment, the communication module 310 may notify the processor 320 that connection with AP1 210 has been performed. For example, the communication module 310 may transfer a connection event message of AP1 210 to the processor 320.

In operation 1016, according to an embodiment, the processor 320 may transfer first roaming group information associated with the connected first AP 210 to the communication module 310. Alternatively, the processor 320 may control the communication module 310 to obtain the first roaming group information associated with the first AP 210. For example, the first roaming group information associated with the first AP 210 communication-connected with the electronic device 301 may include information for "SSID: AP-B, security type:B". According to another embodiment, the processor 320 may transfer stored roaming group information to the communication module 310 regardless of whether a connection with the first AP 210 is made, and the communication module 310 may identify the received roaming group information without involvement of the processor 320 while in connection with AP1 210 and may identify the first roaming group information from the roaming group information.

In operation 1018, according to an embodiment, the communication module 310 may identify the received signal strength indication (RSSI) (monitoring AP1 RSSI) from the first AP 210. For example, the communication module 310 may identify information (or parameters) for identifying roaming start conditions, such as the RSSI, channel utilization, whether data communication is performed, and/or display on/off, while in connection with the first AP 210.

In operation 1020, according to an embodiment, the communication module 310 and the processor 320 may perform a roaming operation when a roaming condition is met (or when roaming is required or when a roaming trigger occurs) (e.g., when the electronic device 301 moves away from AP1 210 (move far from AP1)). For example, the communication module 310 and the processor 320 may start a roaming operation when the strength of the signal received from the connected first AP 210 is lower than a designated signal strength. As another example, the communication module 310 and the processor 320 may start a roaming operation when the channel utilization through the connected first AP 210 is smaller than a designated channel utilization. As another example, the communication module 310 and the processor 320 may start a roaming operation when data communication is not performed through the connected first AP 210. As another example, the communication module 310 and the processor 320 may start a roaming operation when the display is turned off and then turned back on while in connection with the first AP 201. As another example, the communication module 310 and the processor 320 may start a roaming operation based on a user request.

In operation 1022, according to an embodiment, the communication module 310 may perform a scan using the first roaming group information associated with the first AP 210.

For example, in operation 1022, the communication module 310 may transmit a first probe request signal based on the same SSID (e.g., "SSID:AP-A") as the first AP 210, performing a scan (Do scan with specific SSID: AP-A). According to an embodiment, the first AP 210 and the second AP 220 each may receive the first probe request signal transmitted from the communication module 310.

According to an embodiment, the electronic device 301 may transmit the first probe request signal based on the same SSID (e.g., "SSID: AP-A") as the first AP 210 based on the connect request or the roaming group information. For example, the roaming group information may include information for the AP (e.g., AP1) included in the connect request.

In operation 1024, according to an embodiment, the first AP 210 may transmit a first probe response signal based on identifying that the "SSID:AP-A" included in the received first probe request signal is identical to its own SSID, i.e., AP-A (Send response).

In operation 1026, according to an embodiment, the second AP 220 may disregard the received first probe request signal based on identifying that the "SSID:AP-A" included in the received first probe request signal is not identical to its own SSID, i.e., AP-B, and may transmit no response signal (No response because SSID is different).

In operation 1028, according to an embodiment, the communication module 310 may perform a scan using "SSID:AP-B" included in the first roaming group information associated with the first AP 210 (Do scan with specific SSID: AP-B). For example, the communication module 310 may transmit a second probe request signal using "SSID:AP-B". According to an embodiment, the first AP 210 and the second AP 220 each may receive the second probe request signal transmitted from the communication module 310.

In operation 1030, according to an embodiment, the first AP 210 may disregard the received second probe request signal based on identifying that the "SSID:AP-B" included in the received second probe request signal is different from its own SSID, i.e., AP-A, and may transmit no response signal (No response because SSID is different).

In operation 1032, according to an embodiment, the second AP 220 may transmit a second probe response signal based on identifying that the "SSID:AP-B" included in the received second probe request signal is identical to its own SSID, i.e., AP-B (Send response). According to an embodiment, response signals may be further received from other APs having the same SSID than the first AP 210 and the second AP 220.

In operation 1034, according to an embodiment, the communication module 310 may exclude the AP which does not have the same SSID and security type as the SSID and security type included in the first roaming group information associated with the first AP 210 among the scanned first AP 210 and the second AP 220 (or a plurality of APs including the first AP 210 and the second AP 220) from roaming targets (Filter out the AP which does not meet the following condition: SSID==AP-A and security type==A, SSID==AP-B and security type B). According to an embodiment, the communication module 310 may identify that one of the remaining APs after exclusion from the roaming targets among the APs included in the first roaming group information is a roaming target AP.

In operation 1036, according to an embodiment, the communication module 310 may roam and connect to the second AP 220, which is the identified roaming target AP (Roam to AP2). For example, the communication module 310 may seamlessly connect communication from the first AP 210 to the second AP 220

In operation 1038, according to an embodiment, the communication module 310 may notify the processor 320 of being connected (or roamed) to the second AP 220 (Roaming event).

Although not shown, according to an embodiment, the processor 320 may generate second roaming group information based on information of the second AP 220 based on the roaming event received from the communication module 310. For example, the processor 320 may generate the second roaming group information based on the SSID and/or security type of the second AP 220.

Figure 11:
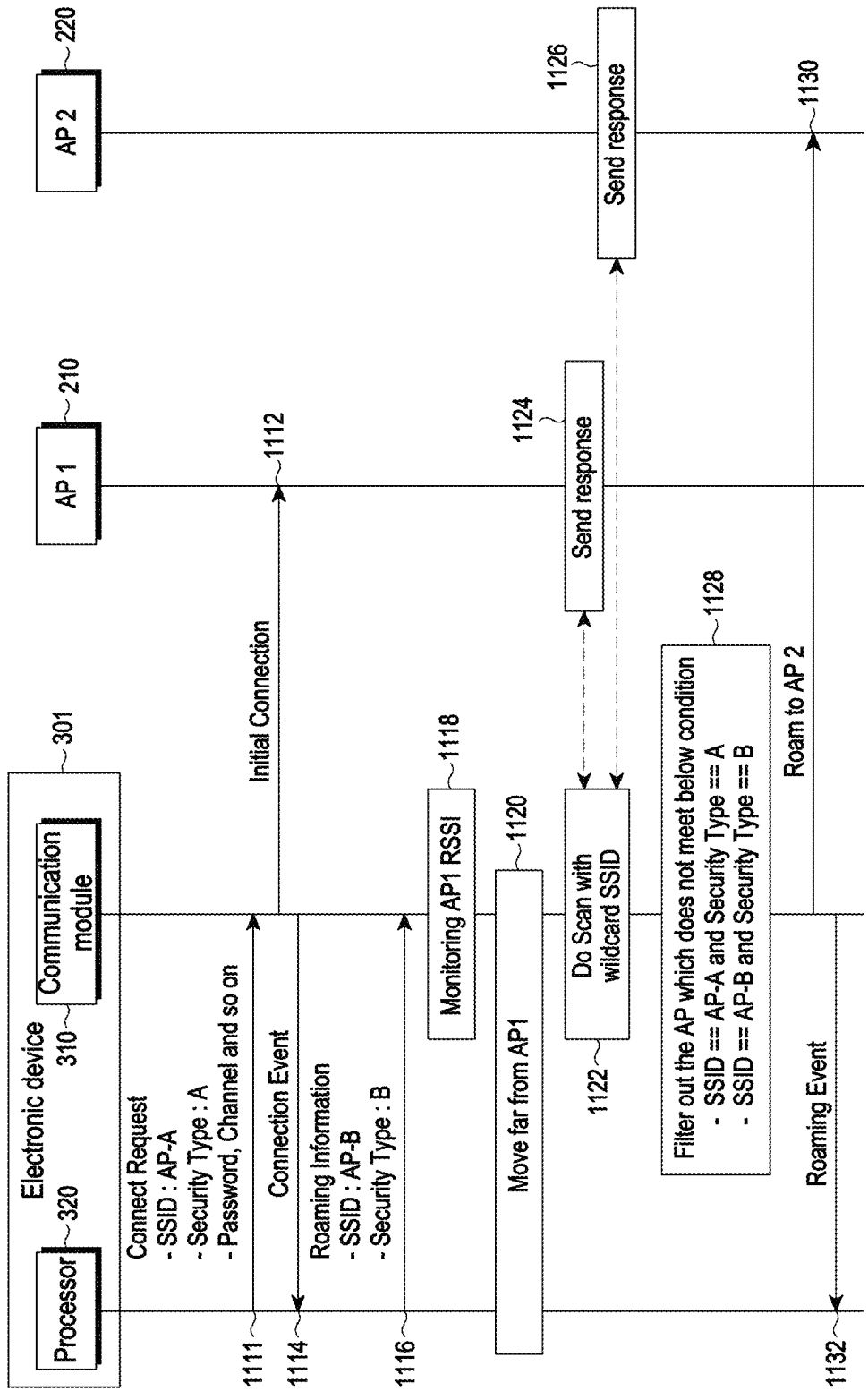
FIG. 11 illustrates a flowchart of a roaming operation using wildcard SSIDs between an electronic device, a first AP, and a second AP according to an embodiment.

FIG. 11 illustrates a flowchart of a roaming operation using wildcard SSIDs between an electronic device, a first AP, and a second AP according to an embodiment.

Referring to FIG. 11, in operation 1111, according to an embodiment, the processor 320 (e.g., the processor 120 of FIG. 1) of the electronic device 301 (e.g., the electronic device 101 of FIG. 1) may transfer a connect request message (connect request) with the first AP (AP1) 210 to the communication module 310 (e.g., the communication module 190 of FIG. 1).

In operation 1112, according to an embodiment, the communication module 310 may perform connection (initial connection) with AP1 210 based on the connect request message. For example, the communication module 310 may perform connection with AP1 210 corresponding to the information including "SSID:AP-A, security type: A, password, channel" based on the information including "SSID: AP-A, security type: A, password, channel" included in the connect request message (connect request).

In operation 1114, according to an embodiment, the communication module 310 may notify the processor 320 that connection with AP1 210 has been performed. For example, the communication module 310 may transfer a connection event message of AP1 210 to the processor 320.

In operation 1116, according to an embodiment, the processor 320 may transfer first roaming group information associated with the connected first AP 210 to the communication module 310. Alternatively, the processor 320 may control the communication module 310 to obtain the first roaming group information associated with the first AP 210. For example, the first roaming group information associated with the first AP 210 communication-connected with the electronic device 301 may include information (e.g., "SSID: AP-B, security type:B") based on the SSID and/or security type of the first AP 210.

In operation 1118, according to an embodiment, the communication module 310 may identify the received signal strength indication (RSSI) (monitoring AP1 RSSI) from the first AP 210. For example, the communication module 310 may identify information (or parameters) for identifying roaming start conditions, such as the RSSI, channel utilization, whether data communication is performed, and/or display on/off, while in connection with the first AP 210.

In operation 1120, according to an embodiment, the communication module 310 and the processor 320 may perform a roaming operation when a roaming condition is met (or when roaming is required or when a roaming trigger occurs) (e.g., when the electronic device 301 moves away from AP1 210 (move far from AP1)). For example, the communication module 310 and the processor 320 may start a roaming operation when the strength of the signal received from the connected first AP 210 is lower than a designated signal strength. As another example, the communication module 310 and the processor 320 may start a roaming operation when the channel utilization through the connected first AP 210 is smaller than a designated channel utilization. As another example, the communication module 310 and the processor 320 may start a roaming operation when data communication is not performed through the connected first AP 210. As another example, the communication module 310 and the processor 320 may start a roaming operation when the display is turned off and then turned back on while in connection with the first AP 201. As another example, the communication module 310 and the processor 320 may start a roaming operation based on a user request.

In operation 1122, according to an embodiment, the communication module 310 may perform a scan using "Wildcard SSID" (Do scan with Wildcard SSID). For example, the communication module 310 may broadcast a probe request signal using "Wildcard SSID." According to an embodiment, the first AP 210 and the second AP 220 each may receive the probe request signal broadcast from the communication module 310.

In operation 1124, according to an embodiment, the first AP 210 may transmit a first probe response signal based on the "BSSID" included in the received probe request signal (Send response).

In operation 1126, according to an embodiment, the second AP 220 may transmit a second probe response signal based on the "BSSID" included in the received probe request signal (Send response).

According to an embodiment, when the specific SSID included in the probe request signal is identical to its own SSID or when the probe request signal includes the Wildcard SSID, the first AP 210 and/or the second AP 220 may transmit the probe response signal. For example, the probe response signal may include information, such as SSID, security type, operation channel, country code, supported data rate, high throughput (HT) mode, very high throughput (VHT) mode, and/or TX power.

In operation 1128, according to an embodiment, the communication module 310 may exclude the AP which does not have the same SSID and security type as the SSID and security type included in the information associated with the first AP 210 and does not have the same SSID and security type as the SSID and security type included in the first roaming group information associated with the first AP 210 among the scanned first AP 210 and the second AP 220 (or a plurality of APs including the first AP 210 and the second AP 220) from roaming targets (Filter out the AP which does not meet the following condition: SSID==AP-A and security type A, SSID==AP-B and security type==B). According to an embodiment, the communication module 310 may identify that one of the remaining APs after excluding the non-roaming target APs based on the information associated with the first AP 210 or the first roaming group information is a roaming target AP.

In operation 1130, according to an embodiment, the communication module 310 may roam and connect to the second AP 220, which is the identified roaming target AP (Roam to AP2). For example, the communication module 310 may stop communication with the first AP 210 and connect communication to the second AP 220 seamlessly.

In operation 1132, according to an embodiment, the communication module 310 may notify the processor 320 of being connected (or roamed) to the second AP 220 (Roaming event).

Although not shown, according to an embodiment, the processor 320 may generate second roaming group information based on information of the second AP 220 based on the roaming event received from the communication module 310. For example, the processor 320 may generate second roaming group information based on the SSID and/or security type of the second AP 220 and a result of performing a scan using the "Wildcard SSID" through the communication module 310 (Do scan with Wildcard SSID).

Figure 12:
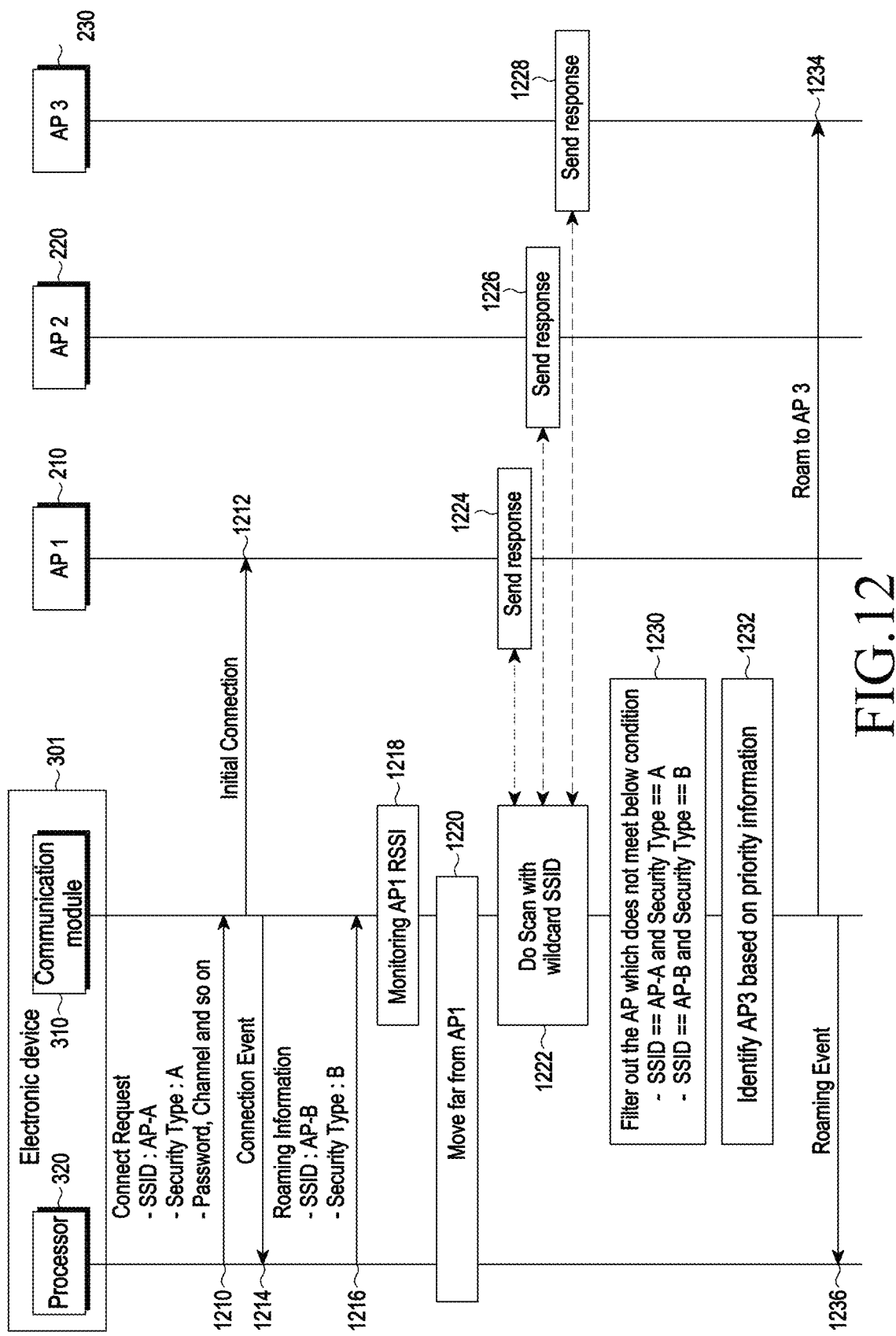
FIG. 12 illustrates a flowchart of a roaming operation based on roaming priority between an electronic device, a first AP, a second AP, and a third AP according to an embodiment.

FIG. 12 illustrates a flowchart of a roaming operation based on roaming priority between an electronic device, a first AP, a second AP, and a third AP according to an embodiment.

Referring to FIG. 12, in operation 1210, according to an embodiment, the processor 320 (e.g., the processor 120 of FIG. 1) of the electronic device 301 (e.g., the electronic device 101 of FIG. 1) may transfer a connect request message (connect request) with the first AP (AP1) 210 to the communication module 310 (e.g., the communication module 190 of FIG. 1).

In operation 1212, according to an embodiment, the communication module 310 may perform connection (initial connection) with AP1 210 based on the connect request message. For example, the communication module 310 may perform connection with AP1 210 corresponding to the information including "SSID:AP-A, security type: A, password, channel" based on the information including "SSID:

AP-A, security type: A, password, channel" included in the connect request message (connect request).

In operation 1214, according to an embodiment, the communication module 310 may notify the processor 320 that connection with AP1 210 has been performed. For example, the communication module 310 may transfer a connection event message of AP1 210 to the processor 320.

In operation 1216, according to an embodiment, the processor 320 may transfer first roaming group information associated with the connected first AP 210 to the communication module 310. Alternatively, the processor 320 may control the communication module 310 to obtain the first roaming group information associated with the first AP 210. For example, the first roaming group information associated with the first AP 210 may include information based on the SSID and/or security type of the first AP 210 (e.g., "SSID: AP-B, security type:B").

In operation 1218, according to an embodiment, the communication module 310 may identify the received signal strength indication (RSSI) (monitoring AP1 RSSI) from the first AP 210. For example, the communication module 310 may identify information (or parameters) for identifying roaming start conditions, such as the RSSI, channel utilization, whether data communication is performed, and/or display on/off, while in connection with the first AP 210.

In operation 1220, according to an embodiment, the communication module 310 and the processor 320 may perform a roaming operation when a roaming condition is met (or when roaming is required or when a roaming trigger occurs) (e.g., when the electronic device 301 moves away from AP1 210 (move far from AP1)). For example, the communication module 310 and the processor 320 may start a roaming operation when the strength of the signal received from the connected first AP 210 is lower than a designated signal strength. As another example, the communication module 310 and the processor 320 may start a roaming operation when the channel utilization through the connected first AP 210 is smaller than a designated channel utilization. As another example, the communication module 310 and the processor 320 may start a roaming operation when data communication is not performed through the connected first AP 210. As another example, the communication module 310 and the processor 320 may start a roaming operation when the display is turned off and then turned back on while in connection with the first AP 201. As another example, the communication module 310 and the processor 320 may start a roaming operation based on a user request.

In operation 1222, according to an embodiment, the communication module 310 may perform a scan using "Wildcard SSID" (Do scan with Wildcard SSID). For example, the communication module 310 may broadcast a probe request signal using "Wildcard SSID." According to an embodiment, the first AP 210, the second AP 220, and a third AP 230 each may receive the probe request signal broadcast from the communication module 310.

In operation 1224, according to an embodiment, the first AP 210 may transmit a first probe response signal based on the "BSSID" included in the received probe request signal (Send response).

In operation 1226, according to an embodiment, the second AP 220 may transmit a second probe response signal based on the "BSSID" included in the received probe request signal (Send response).

In operation 1228, according to an embodiment, the third AP 230 may transmit a third probe response signal based on the "BSSID" included in the received probe request signal (Send response).

In operation 1230, according to an embodiment, the communication module 310 may exclude the AP which does not have the same SSID and security type as the SSID and security type included in the first roaming group information associated with the first AP 210 among APs which do not have the same SSID and security type as the SSID and security type included in the information associated with the first AP 210 among the scanned first AP 210, second AP 220, and third AP 230 (or a plurality of APs including the first AP 210, the second AP 220, and the third AP 230) from roaming targets (Filter out the AP which does not meet the following condition: SSID==AP-A and security type==A, SSID==AP-B and security type B). According to an embodiment, the communication module 310 may identify that one of the remaining APs after excluding non-roaming target APs among APs associated with the first roaming group information or the information associated with the first AP 210 is a roaming target AP. According to an embodiment, if there is a remaining AP after excluding the non-roaming target APs based on the "SSID:AP-A, security type: A," the communication module 310 may identify that the remaining AP is a roaming target AP. According to an embodiment, if there is no remaining AP after excluding the non-roaming target APs based on the "SSID:AP-A, security type: A," and if there is a remaining AP after excluding the non-roaming target APs based on the "SSID:AP-B, security type: B," the communication module 310 may identify that the remaining AP is a roaming target AP. Although not shown, according to an embodiment, in operation 1216, the first roaming group information associated with the first AP 210, transferred by the processor 320 to the communication module 310, may include a plurality of SSIDs and/or security types. For example, "SSID:AP-A, security type:C" may be included in addition to "SSID:AP-B, security type:B". According to an embodiment, when the first roaming group information associated with the first AP 210 includes a plurality of SSIDs and/or security types, a roamable AP may be identified based on the priority of the plurality of SSIDs and/or security types. For example, if "SSID:AP-B, security type:B" has priority over "SSID:AP-A, security type:C", the AP corresponding to "SSID:AP-B, security type:B" may be identified as a roamable AP.

In operation 1232, according to an embodiment, when there are a plurality of roaming target APs (e.g., the second AP 220 and the third AP 230), the communication module 310 may identify that the AP with higher priority (e.g., the third AP 230) is a roaming target AP based on the priority information associated with the first roaming group information or the information associated with the first AP 210. For example, when there are a plurality of APs corresponding to the first roaming group information or the information associated with the first AP 210, the AP having the same SSID as the first AP 210 among the plurality of APs may have priority, or the AP having the same security type as the first AP 210 among the plurality of APs may have priority. Further, a weight may be assigned to the signal strength (received signal strength indication (RSSI), channel utilization, whether data communication with the network 250 is performed, and/or security, and the AP with the highest priority based on the weight among the plurality of APs may be identified as a roamable AP.

In operation 1234, according to an embodiment, the communication module 310 may roam and connect to the third AP 230, which is the identified roaming target AP (Roam to AP3). For example, the communication module 310 may stop communication with the first AP 210 and connect communication to the third AP 230 seamlessly.

In operation 1236, according to an embodiment, the communication module 310 may notify the processor 320 of being connected (or roamed) to the third AP 230 (Roaming event).

According to various embodiments, it is possible to enable an electronic device to roam with another AP (e.g., AP2 or AP3) having a different SSID and security type from AP1 while the electronic device is in connection with AP1. According to various embodiments, it is possible to enable an electronic device to roam by providing information for AP2 which has a different SSID and security type from AP1 but the electronic device may roam to, while the electronic device is in connection with AP1, thereby ensuring continuity of use of Wi-Fi and minimizing user inconvenience.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, there may be provided a non-volatile storage medium storing instructions, the instructions configured to be executed by at least one processor to enable the at least one processor to perform at least one operation. The at least one operation may comprise identifying first roaming group information associated with a first access point (AP) of a first service set identification (SSID) and a first security type based on a connection with the first AP through a communication module, identifying whether there is an AP having the first SSID and the first security type when roaming while performing the connection with the first AP through the communication module, and in response to being not identified the AP having the first SSID and the first security type, performing roaming from the first AP to the second AP which is identified based on the first roaming group information through the communication module.

The embodiments herein are provided merely for better understanding of the present disclosure, and the present disclosure should not be limited thereto or thereby. It should be appreciated by one of ordinary skill in the art that various changes in form or detail may be made to the embodiments without departing from the scope of the present disclosure defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
communication circuitry supporting wireless fidelity (Wi-Fi) communication;
memory for storing instructions; and
a processor operatively connected with the communication circuitry and the memory,
wherein the instructions, when executed by the processor, cause the electronic device to:
perform a communication connection with a first access point (AP) of a first service set identification (SSID) and a first security type through the communication circuitry,
obtain first roaming group information associated with the first AP, wherein the first roaming group information includes information of the first AP, AP information of each of a plurality of roamable APs, information indicating of being roamable between the first AP and each of the plurality of roamable APs, and priorities of the plurality of roamable APs,
identify whether there is an AP having the first SSID and the first security type when roaming while performing the communication connection with the first AP through the communication circuitry, and
in response to the AP having the first SSID and the first security type being not identified, perform roaming from the first AP to a second AP having a highest roaming priority based on the first roaming group information.

2. The electronic device of claim 1, wherein the instructions, when executed by the processor, cause the electronic device to transfer second roaming group information associated with the second AP to the communication circuitry based on a connection with the second AP through the communication circuitry.

3. The electronic device of claim 1, wherein the instructions, when executed by the processor, cause the electronic device to, in response to identifying the AP having the first SSID and the first security type, perform roaming from the first AP to the AP having the first SSID and the first security type.

4. The electronic device of claim 1, wherein the first roaming group information includes at least one of a second SSID different from the first SSID or a second security type different from the first security type.

5. The electronic device of claim 4, wherein the instructions, when executed by the processor, cause the electronic device to:
in response to the AP having the first SSID and the first security type being not identified, search for a plurality of APs, and
identify the second AP having the highest roaming priority among the plurality of APs based on the first roaming group information.

6. The electronic device of claim 1, wherein the instructions, when executed by the processor, cause the electronic device to:
obtain the AP information of each of a plurality of APs,
identify APs roamable between each other using the AP information of each of the plurality of APs, and
store, in the memory, roaming group information on at least one roaming group obtained by grouping the APs roamable between each other.

7. The electronic device of claim 6, wherein the AP information includes at least one of an SSID, a basic service set identification (BSSID), a media access control (MAC) address, a dynamic host configuration protocol (DHCP) server address, connection history information, AP position information, or user input information.

8. The electronic device of claim 6, wherein the instructions, when executed by the processor, cause the electronic device to obtain the roaming group information based on an occurrence of a designated event.

9. The electronic device of claim 8, wherein the designated event includes at least one of an event associated with adding, changing, or deleting AP information, an AP connection event, or a user input event.

10. A method for roaming based on wireless fidelity (Wi-Fi) in an electronic device, the method comprising:
identifying first roaming group information associated with a first access point (AP) of a first service set identification (SSID) and a first security type based on a connection with the first AP through communication circuitry, wherein the first roaming group information includes information of the first AP, AP information of each of a plurality of roamable APs, information indicating of being roamable between the first AP and each of the plurality of roamable APs, and priorities of the plurality of roamable APs;
identifying whether there is an AP having the first SSID and the first security type when roaming while performing the connection with the first AP through the communication circuitry; and
in response to the AP having the first SSID and the first security type being not identified, performing roaming from the first AP to a second AP having a highest roaming priority based on the first roaming group information.

11. The method of claim 10, further comprising transferring second roaming group information associated with the second AP to the communication circuitry based on a connection with the second AP through the communication circuitry.

12. The method of claim 10, wherein in response to identifying the AP having the first SSID and the first security type, performing a roaming from the first AP to the AP having the first SSID and the first security type.

13. The method of claim 10, wherein the first roaming group information includes at least one of a second SSID different from the first SSID or a second security type different from the first security type.

14. The method of claim 13, further comprising:
in response to the AP having the first SSID and the first security type being not identified, searching for a plurality of APs; and
identifying the second AP having the highest roaming priority among the plurality of Aps based on the first roaming group information.

15. The method of claim 10, further comprising:
obtaining the AP information of each of the plurality of APs, identifying APs roamable between each other using the AP information of each of the plurality of APs, and storing, in a memory, roaming group information on at least one roaming group obtained by grouping the APs roamable between each other.

16. The method of claim 15, wherein the AP information includes at least one of an SSID, a basic service set identification (BSSID), a media access control (MAC) address, a dynamic host configuration protocol (DHCP) server address, connection history information, AP position information, or user input information.

17. The method of claim 15, wherein the roaming group information is obtained based on an occurrence of a designated event.

18. The method of claim 17, wherein the designated event includes at least one of an event associated with adding, changing, or deleting AP information, an AP connection event, or a user input event.

19. A non-transitory machine readable storage medium comprising machine readable instructions that, when executed by a processor of an electronic device, cause the electronic device to:

identify first roaming group information associated with a first access point (AP) of a first service set identification (SSID) and a first security type based on a connection with the first AP through communication circuitry, wherein the first roaming group information includes information of the first AP, information of each of a plurality of roamable APs, AP information indicating of being roamable between the first AP and each of the plurality of roamable APs, and priorities of the plurality of roamable APs, identify whether there is an AP having the first SSID and the first security type when roaming while performing the connection with the first AP through the communication circuitry, and in response to the AP having the first SSID and the first security type being not identified, perform roaming from the first AP to a second AP having a highest roaming priority based on the first roaming group information.

20. The non-transitory machine readable storage medium of claim 19, wherein the instructions, when executed by the processor, cause the electronic device to transfer second roaming group information associated with the second AP to the communication circuitry based on a connection with the second AP through the communication circuitry.

* * * * *